(12) United States Patent
Ito et al.

(10) Patent No.: US 12,132,168 B2
(45) Date of Patent: Oct. 29, 2024

(54) BATTERY

(71) Applicant: Panasonic Intellectual Property Management Co., Ltd., Osaka (JP)

(72) Inventors: Yusuke Ito, Nara (JP); Kazuya Iwamoto, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 533 days.

(21) Appl. No.: 17/512,671

(22) Filed: Oct. 28, 2021

(65) Prior Publication Data

US 2022/0052375 A1 Feb. 17, 2022

Related U.S. Application Data

(63) Continuation of application No. PCT/JP2020/006737, filed on Feb. 20, 2020.

(30) Foreign Application Priority Data

May 15, 2019 (JP) .................................. 2019-091907

(51) Int. Cl.
*H01M 10/0562* (2010.01)
(52) U.S. Cl.
CPC .......... *H01M 10/0562* (2013.01); *H01M 2300/0068* (2013.01)
(58) Field of Classification Search
None
See application file for complete search history.

(56) References Cited

FOREIGN PATENT DOCUMENTS

| CN | 109659474 A | 4/2019 |
|----|-------------|--------|
| JP | 2004-206942 A | 7/2004 |
| JP | 2011-054457 | 3/2011 |
| JP | 2017-538266 | 12/2017 |
| JP | 2018-101466 | 6/2018 |
| KR | 10-2019050226 A | 5/2019 |
| WO | 2016/089899 | 6/2016 |

OTHER PUBLICATIONS

Machine Translation of KR20190050226 (Year: 2019).*
The Extended European Search Report dated Jun. 13, 2022 for the related European Patent Application No. 20805996.4.
Han Fudong et al: "Electrochemical Stability of Li 10 Ge P 2 S 12 and Li 7 La 3 Zr 2 O 12 Solid Electrolytes", Advanced Energy Materials, vol. 6, No. 8, Jan. 21, 2016 (Jan. 21, 2016), p. 1501590, XP55926440.
English Translation of Chinese Search Report dated Mar. 13, 2024 for the related Chinese Patent Application No. 202080020656.3.
International Search Report of PCT application No. PCT/JP2020/006737 dated May 19, 2020.

* cited by examiner

*Primary Examiner* — Wyatt P McConnell
(74) *Attorney, Agent, or Firm* — Rimon P.C.

(57) ABSTRACT

A battery including: a positive electrode; a negative electrode; a first solid electrolyte layer that is positioned between the positive electrode and the negative electrode and that contains a metal alloyable with lithium; and a second solid electrolyte layer that is positioned between the negative electrode and the first solid electrolyte layer and that is free of the metal.

10 Claims, 2 Drawing Sheets

BATTERY

BACKGROUND

1. Technical Field

The present disclosure relates to a battery.

2. Description of the Related Art

Japanese Unexamined Patent Application Publication No. 2011-054457 (PTL 1) discloses an all-solid state lithium secondary battery including an alloy layer containing lithium (Li). The alloy layer is formed between a metal electrode containing Li as a main component and a solid electrolyte having a garnet-like crystal structure and being a ceramic sintered compact containing aluminum (Al). PTL 1 discloses that the alloy layer prevents or reduces short circuiting associated with deposition of Li dendrite in the solid electrolyte.

SUMMARY

In the related art, there is a need of batteries that cause less voltage abnormality.

In one general aspect, the techniques disclosed here feature a battery including: a positive electrode; a negative electrode; a first solid electrolyte layer that is positioned between the positive electrode and the negative electrode and that contains a metal alloyable with lithium; and a second solid electrolyte layer that is positioned between the negative electrode and the first solid electrolyte layer and that is free of the metal.

The present disclosure provides a battery that causes less voltage abnormality.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
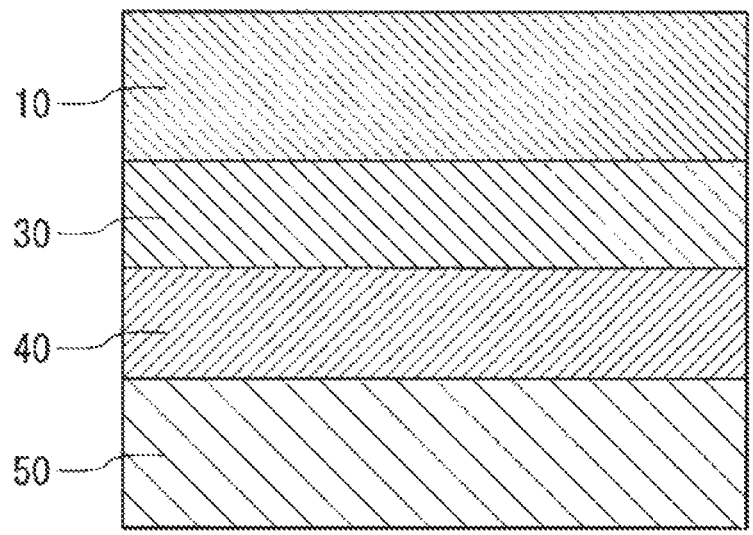
FIG. 1 is a schematic cross-sectional view of the structure of a battery according to a first embodiment.

Underlying Knowledge Forming Basis of the Present Disclosure

First, the viewpoints of the inventors of the present disclosure will be described below.

All-solid state batteries including solid electrolytes are expected to have high input-output characteristics. However, for example, an all-solid state battery including a sulfide solid electrolyte may cause voltage abnormality in the final stage of charging. Voltage abnormality is markedly observed particularly when the all-solid state battery is charged quickly. Voltage abnormality is assumed to occur in the following manner. First, the negative electrode potential reaches the lithium redox potential during charging of the battery. Lithium is thus deposited on the negative electrode. Deposited lithium grows as a dendrite in the solid electrolyte. Upon some of deposited lithium reaching the positive electrode, short circuiting locally occurs. This may cause voltage abnormality.

As described above, PTL 1 discloses that the alloy layer prevents or reduces short circuiting associated with deposition of lithium dendrite in the solid electrolyte. However, the alloy layer of PTL 1 may not have sufficient ionic conductivity. In the battery of PTL 1, the alloy layer may function as a resistive layer to degrade battery characteristics.

Overview of One Aspect of the Present Disclosure

A battery according to a first aspect of the present disclosure includes
a positive electrode,
a negative electrode, and
a first solid electrolyte layer that is positioned between the positive electrode and the negative electrode and that contains a metal alloyable with lithium.

According to the first aspect, the first solid electrolyte layer contains a metal alloyable with lithium. When lithium dendrite grows from the negative electrode during charging of the battery, the lithium dendrite comes into contact with the metal. The metal in contact with lithium dendrite forms an alloy with lithium. This suppresses the growth of lithium dendrite to prevent lithium dendrite from reaching the positive electrode. Preventing lithium dendrite from reaching the positive electrode can suppress occurrence of local short circuiting. Since the first solid electrolyte layer contains a solid electrolyte, the first solid electrolyte layer has sufficient ionic conductivity. In the battery including the first solid electrolyte layer, voltage abnormality is thus less likely to occur.

The battery according to the first aspect further includes a second solid electrolyte layer that is positioned between the negative electrode and the first solid electrolyte layer and that is free of the metal. Since the battery includes a second solid electrolyte, the first solid electrolyte layer is not in direct contact with the negative electrode. In other words, the second solid electrolyte blocks electron conduction between the first solid electrolyte layer and the negative electrode. Even when the metal contained in the first solid electrolyte layer forms an alloy with lithium, the first solid electrolyte layer has almost no effect on the negative electrode potential. In other words, the negative electrode potential is determined only by the material of the negative electrode. The second solid electrolyte can further suppress occurrence of voltage abnormality in the battery.

In a second aspect of the present disclosure, for example, a thickness of the first solid electrolyte layer may be smaller than a thickness of the second solid electrolyte layer according to the first aspect. According to the second aspect, ionic conductivity is sufficiently ensured in the battery.

In a third aspect of the present disclosure, for example, the battery according to the first or second aspect may further include a third solid electrolyte layer that is positioned between the positive electrode and the first solid electrolyte layer and that is free of the metal. According to the third aspect, the battery causes less voltage abnormality.

In a fourth aspect of the present disclosure, for example, the metal may include at least one selected from the group consisting of gold, silicon, aluminum, zinc, cadmium, indium, lead, gallium, bismuth, antimony, tin, silver, and magnesium in the battery according to any one of the first to third aspects. According to the fourth aspect, the battery causes less voltage abnormality.

In a fifth aspect of the present disclosure, for example, the metal may include aluminum in the battery according to the fourth aspect. According to the fifth aspect, the potential at which lithium and aluminum form an alloy is 0.3 V vs. Li, which is close to the lithium redox potential. For this, when the metal includes aluminum, the metal in contact with lithium dendrite can easily form an alloy with lithium. In other words, the metal can assuredly suppress the growth of lithium dendrite.

In a sixth aspect of the present disclosure, for example, the content of the metal in the first solid electrolyte layer may be greater than or equal to 20 vol % and less than or equal to 80 vol % in the battery according to any one of the first to fifth aspects. According to the sixth aspect, it is possible to sufficiently suppress local short circuiting that occurs upon lithium dendrite reaching the positive electrode.

Embodiments of the present disclosure will be described below with reference to the drawings. It is noted that the present disclosure is not limited to the following embodiments.

First Embodiment

FIG. 1 is a schematic cross-sectional view of the structure of a battery 100 according to a first embodiment. Referring to FIG. 1, the battery 100 includes a positive electrode 10, a first solid electrolyte layer 30, and a negative electrode 50. The battery 100 further includes a second solid electrolyte layer 40. The first solid electrolyte layer 30 is positioned between the positive electrode 10 and the negative electrode 50. The first solid electrolyte layer 30 is, for example, in direct contact with the positive electrode 10. The second solid electrolyte layer 40 is positioned between the negative electrode 50 and the first solid electrolyte layer 30. The second solid electrolyte layer 40 is, for example, in direct contact with both the negative electrode 50 and the first solid electrolyte layer 30.

The first solid electrolyte layer 30 contains a solid electrolyte and a metal A alloyable with lithium. The first solid electrolyte layer 30 is, for example, a composite of the solid electrolyte and the metal A. The first solid electrolyte layer 30 has, for example, a first portion made of the metal A and a second portion made of the solid electrolyte. The compositions of the first portion and the second portion can be determined by, for example, energy dispersive X-ray spectroscopy (EDS). The first solid electrolyte layer 30 has, for example, two or more first portions. In the first solid electrolyte layer 30, two or more first portions are buried in the second portion. Two or more first portions are dispersed in the second portion. The first portions each have, for example, a particle shape. The term "particle shape" as used herein includes a spherical shape, an ellipsoidal shape, a scaly shape, and a fibrous shape.

The metal A includes, for example, at least one selected from the group consisting of gold (Au), silicon (Si), aluminum (Al), zinc (Zn), cadmium (Cd), indium (In), lead (Pb), gallium (Ga), bismuth (Bi), antimony (Sb), tin (Sn), silver (Ag), and magnesium (Mg). As described below, the metal A suppresses the growth of lithium dendrite in the battery 100. To assuredly suppress the growth of lithium dendrite, the metal A may include aluminum. The first solid electrolyte layer 30 contains, for example, a simple substance of the metal A. The first solid electrolyte layer 30 may contain a simple substance of aluminum. Part of the metal A contained in the first solid electrolyte layer 30 may form an alloy with lithium.

The content of the metal A in the first solid electrolyte layer 30 is not limited and may be greater than or equal to 20 vol % and less than or equal to 80 vol %, or may be greater than or equal to 40 vol % and less than or equal to 60 vol %.

The solid electrolyte may be, for example, a sulfide solid electrolyte, an oxide solid electrolyte, a halide solid electrolyte, a polymer solid electrolyte, or a complex hydride solid electrolyte. The solid electrolyte is free of the metal A alloyable with lithium. In other words, the solid electrolyte is free of a simple substance of the metal A.

Examples of the sulfide solid electrolyte may include $Li_2S-P_2S_5$, $Li_2S-SiS_2$, $Li_2S-B_2S_3$, $Li_2S-GeS_2$, $Li_{3.25}Ge_{0.25}P_{0.75}S_4$, and $Li_{10}GeP_2S_{12}$. For example, LiX, $Li_2O$, $MO_p$, or $Li_qMO_r$ may be added to the sulfide solid electrolyte. X in LiX is F, Cl, Br, or I. M in $MO_p$ and $Li_qMO_r$ is any one of P, Si, Ge, B, Al, Ga, In, Fe, and Zn. p in $MO_p$ is a natural number. q and r in $Li_qMO_r$ are natural numbers.

Examples of the oxide solid electrolyte may include NASICON solid electrolytes, such as $LiTi_2(PO_4)_3$ and element-substituted products thereof; $(LaLi)TiO_3$-based perovskite solid electrolytes; LISICON solid electrolytes, such as $Li_{14}ZnGe_4O_{16}$, $Li_4SiO_4$, $LiGeO_4$, and element-substituted products thereof; garnet solid electrolytes, such as $Li_7La_3Zr_2O_{12}$ and element-substituted products thereof; $Li_3N$ and H-substituted products thereof; $Li_3PO_4$ and N-substituted products thereof; glass and glass ceramics formed by adding, for example, $Li_2SO_4$ or $Li_2CO_3$ to a Li—B—O compound, such as $LiBO_2$ or $Li_3BO_3$, serving as a base.

Examples of the halide solid electrolyte may include materials represented by composition formula $Li_\alpha M_\beta X_\gamma$. In the composition formula, α, β, and γ are values greater than 0. M includes a metal element other than Li. X is one or two or more elements selected from the group consisting of Cl, Br, I, and F. Metal elements include metalloid elements. Examples of metalloid elements include B, Si, Ge, As, Sb, and Te. Metal elements refer to all elements in groups 1 to 12 of the periodic table, except hydrogen; metalloid elements; and all elements in groups 13 to 16 of the periodic table, except metalloid elements, C, N, P, O, S, and Se. The metal element is, for example, an element that may change into a cation when it combines with a halogen compound to form an inorganic compound. Examples of the halide solid electrolyte may include $Li_3YX_6$, $Li_2MgX_4$, $Li_2FeX_4$, $Li(Al,Ga,In)X_4$, and $Li_3(Al,Ga,In)X_6$. In these composition formulas, X's each independently represent F, Cl, Br, or I.

The polymer solid electrolyte may be, for example, a compound including a polymer compound and a lithium salt. The polymer compound may have an ethylene oxide structure. Having an ethylene oxide structure, the polymer compound can have a high lithium salt content. In this case, the polymer solid electrolyte can have high ionic conductivity. Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. The polymer solid electrolyte contains, for example, one lithium salt or a mixture of two or more lithium salts selected from these.

Examples of the complex hydride solid electrolyte may include $LiBH_4$—LiI, and $LiBH_4$—$P_2S_5$.

The first solid electrolyte layer 30 may further contain a binder. The binder improves, for example, the adhesion between the first portions and the second portion in the first solid electrolyte layer 30. The binder is, for example, a resin material. Examples of the binder include polyvinylidene fluoride, polytetrafluoroethylene, polyethylene, polypropylene, aramid resin, polyamide, polyimide, polyamideimide, polyacrylonitrile, poly(acrylic acid), poly(methyl acrylate), poly(ethyl acrylate), poly(hexyl acrylate), poly(methacrylic acid), poly(methyl methacrylate), poly(ethyl methacrylate), poly(hexyl methacrylate), poly(vinyl acetate), polyvinylpyrrolidone, polyether, polyethersulfone, hexafluoropolypropylene, styrene-butadiene rubber, and carboxymethylcellulose. The binder may be a copolymer of two or more selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. The first solid electrolyte layer 30 contains, for example, one binder or a mixture of two or more binders selected from these.

In the first solid electrolyte layer 30, the volume fraction v of the first portions in the total volume of the first portions and the second portion satisfies, for example, 20 vol %≤v≤80 vol %. In this case, two or more first portions are easily dispersed in the second portion, and short circuiting of the battery 100 can be suppressed sufficiently. The fraction v may satisfy 40 vol %≤v≤60 vol %.

When the first portions have a particle shape, the average particle size of the first portions is, for example, less than or equal to 10 μm in view of the rate at which lithium and the metal A contained in the first portions form an alloy. The lower limit of the average particle size of the first portions is not limited and is, for example, 1 μm. The average particle size of the first portions can be determined by, for example, the following method. First, the cross section of the first solid electrolyte layer 30 is observed with a scanning electron microscope. In the obtained electron microscopy image, the area of a specific first portion is calculated by image processing. The diameter of a circle having the same area as the calculated area is regarded as the particle size of the specific first portion (the diameter of the particle). The particle sizes of certain numbers (e.g., 50) of the first portions are calculated, and the average of the calculated values is regarded as the average particle size of the first portions.

The first solid electrolyte layer 30 has, for example, a thickness greater than or equal to 1 μm and less than or equal to 200 μm. When the first solid electrolyte layer 30 has a thickness greater than or equal to 1 μm, there is less possibility of short circuiting between the positive electrode 10 and the negative electrode 50. When the first solid electrolyte layer 30 has a thickness less than or equal to 200 μm, the battery 100 can operate with high input-output power. To ensure sufficient ionic conductivity, a thickness of the first solid electrolyte layer 30 may be smaller than a thickness of the second solid electrolyte layer 40.

The second solid electrolyte layer 40 contains a solid electrolyte, but is free of the metal A alloyable with lithium. Examples of the solid electrolyte contained in the second solid electrolyte layer 40 include the solid electrolytes described above in the first solid electrolyte layer 30. The solid electrolyte contained in the second solid electrolyte layer 40 may be the same as or different from that contained in the first solid electrolyte layer 30. The second solid electrolyte layer 40 contains, for example, the solid electrolyte as a main component. The "main component" means a component present in the largest amount in terms of weight ratio in the second solid electrolyte layer 40. The second solid electrolyte layer 40 may consist essentially of the solid electrolyte. The term "consist essentially of" means excluding other components that change the essential characteristics of the mentioned material. It is noted that the second solid electrolyte layer 40 may contain impurities in addition to the solid electrolyte. To improve the adhesion between solid electrolyte particles, the second solid electrolyte layer 40 may further contain a binder. Examples of the binder contained in the second solid electrolyte layer 40 include the binders described above in the first solid electrolyte layer 30.

The second solid electrolyte layer 40 has, for example, a thickness greater than or equal to 1 μm and less than or equal to 200 μm. When the second solid electrolyte layer 40 has a thickness greater than or equal to 1 μm, there is less possibility of short circuiting between the positive electrode 10 and the negative electrode 50. When the second solid electrolyte layer 40 has a thickness less than or equal to 200 μm, the battery 100 can operate with high input-output power.

The positive electrode 10 has, for example, a positive electrode current collector and a layer containing a positive electrode active material. The positive electrode 10 may have a positive electrode mixture layer containing a positive electrode active material and a solid electrolyte. Examples of the positive electrode active material may include lithium-containing transition metal oxides, transition metal fluorides, polyanion materials, fluorinated polyanion materials, transition metal sulfides, transition metal oxyfluorides, transition metal oxysulfides, and transition metal oxynitrides. In particular, the use of a lithium-containing transition metal oxide as a positive electrode active material can increase the average discharge voltage of the battery 100 while reducing the production costs. Examples of the solid electrolyte contained in the positive electrode 10 include the solid electrolytes described above in the first solid electrolyte layer 30.

The positive electrode active material has, for example, a particle shape. The positive electrode active material may have a median diameter greater than or equal to 0.1 μm and less than or equal to 100 μm. When the positive electrode active material has a median diameter greater than or equal to 0.1 μm, the positive electrode active material and the solid electrolyte are dispersed well in the positive electrode mixture layer. In this case, the battery 100 has good charging/discharging characteristics. When the positive electrode active material has a median diameter less than or equal to 100 μm, the lithium diffusion rate in the positive electrode active material is high enough. The battery 100 including the positive electrode active material can thus operate with high output power. In the positive electrode 10, the solid electrolyte may have a particle shape. The positive electrode active material may have a larger median diameter than the solid electrolyte. In this case, the positive electrode active material and the solid electrolyte are dispersed well in the positive electrode mixture layer. The median diameter means a particle size (d50) at a cumulative volume of 50% in the particle size distribution measured with a laser diffraction particle size analyzer or other analyzers.

To improve the adhesion between the materials in the layer, the layer containing the positive electrode active material may further contain a binder. Examples of the binder contained in this layer include the binders described above in the first solid electrolyte layer 30. To improve the electronic conductivity, the layer containing the positive electrode active material may further contain a conductive assistant. Examples of the conductive assistant may include graphites, such as natural graphite and artificial graphite; carbon blacks, such as acetylene black and Ketjenblack; conductive fibers, such as carbon fibers and metal fibers; fluorinated carbon; metal powders, such as aluminum powder; conductive whiskers, such as zinc oxide whisker and potassium titanate whisker; conductive metal oxides, such as titanium oxide; and conductive polymer compounds, such as polyaniline, polypyrrole, and polythiophene. The use of a conductive assistant containing carbon can reduce the cost of the battery 100.

The positive electrode current collector is made of, for example, a metal material, such as aluminum, stainless steel, titanium, or an alloy containing these metals. Aluminum and aluminum-containing alloys are inexpensive and easily formed into a thin film. The positive electrode current collector may be porous or non-porous. The positive electrode current collector has, for example, a sheet or film shape. The positive electrode current collector may be, for example, metal foil or mesh. The positive electrode current collector may have a thickness greater than or equal to 1 µm and less than or equal to 30 µm. When the positive electrode current collector has a thickness greater than or equal to 1 µm, the positive electrode current collector has sufficient mechanical strength and is thus less likely to crack or tear. When the positive electrode current collector has a thickness less than or equal to 30 µm, the battery 100 has high energy density.

The positive electrode 10 may have a thickness greater than or equal to 10 µm and less than or equal to 500 µm. When the positive electrode 10 has a thickness greater than or equal to 10 µm, the battery 100 has sufficient energy density. When the positive electrode 10 has a thickness less than or equal to 500 µm, the battery 100 can operate with high output power.

The negative electrode 50 has, for example, a negative electrode current collector and a layer containing a negative electrode active material. The negative electrode 50 may have a negative electrode mixture layer containing a negative electrode active material and a solid electrolyte. The material of the negative electrode active material may be a material that accepts and releases metal ions, or may be a material that accepts and releases lithium ions. Examples of the negative electrode active material may include lithium metal; metals, alloys, or compounds alloyable with lithium; carbon materials; transition metal oxides; and transition metal sulfides. Examples of carbon materials may include graphite, and non-graphite carbon, such as hard carbon and coke. Examples of transition metal oxides may include CuO and NiO. Examples of transition metal sulfides may include copper sulfide represented by composition formula CuS. Examples of metals, alloys, or compounds alloyable with lithium may include silicon compounds, tin compounds, and aluminum compounds. The use of a carbon material as a negative electrode active material can increase the average discharge voltage of the battery 100 while reducing the production costs. In view of the capacity density of the battery 100, the negative electrode active material may contain silicon (Si), tin (Sn), a silicon compound, a tin compound, or other substances. Examples of the solid electrolyte contained in the negative electrode 50 include the solid electrolytes described above in the first solid electrolyte layer 30.

The negative electrode active material has, for example, a particle shape. The negative electrode active material may have a median diameter greater than or equal to 0.1 µm and less than or equal to 100 µm. When the negative electrode active material has a median diameter greater than or equal to 0.1 µm, the negative electrode active material and the solid electrolyte are dispersed well in the negative electrode mixture layer. In this case, the battery 100 has good charging/discharging characteristics. When the negative electrode active material has a median diameter less than or equal to 100 µm, the lithium diffusion rate in the negative electrode active material is high enough. The battery 100 including the negative electrode active material can thus operate with high output power. In the negative electrode 50, the solid electrolyte may have a particle shape. The negative electrode active material may have a larger median diameter than the solid electrolyte. In this case, the negative electrode active material and the solid electrolyte are dispersed well in the negative electrode mixture layer.

To improve the adhesion between the materials in the layer, the layer containing the negative electrode active material may further contain a binder. Examples of the binder contained in this layer include the binders described above in the first solid electrolyte layer 30. To improve the electronic conductivity, the layer containing the negative electrode active material may further contain a conductive assistant. Examples of the conductive assistant contained in the layer containing the negative electrode active material include the conductive assistants described above in the layer containing the positive electrode active material.

The negative electrode current collector is made of, for example, a metal material, such as stainless steel, nickel, copper, or an alloy containing these metals. Copper and copper-containing alloys are inexpensive and easily formed into a thin film. The negative electrode current collector may be porous or non-porous. The negative electrode current collector has, for example, a sheet or film shape. The negative electrode current collector may be, for example, metal foil or mesh. The negative electrode current collector may have a thickness greater than or equal to 1 µm and less than or equal to 30 µm. When the negative electrode current collector has a thickness greater than or equal to 1 µm, the negative electrode current collector has sufficient mechanical strength and is thus less likely to crack or tear. When the negative electrode current collector has a thickness less than or equal to 30 µm, the battery 100 has high energy density.

The negative electrode 50 may further contain a solid electrolyte interphase (SEI). In the related art, the SEI is known to form when a solvent contained in a non-aqueous electrolyte solution reacts with a negative electrode active material during the initial charging of a lithium ion secondary battery or a lithium ion capacitor. The SEI is a passivation film containing the product of the above reaction and positioned on the surface of the negative electrode active material. The SEI is known to suppress the decomposition reaction of the non-aqueous electrolyte solution on the surface of the negative electrode active material. Even in the battery 100 of this embodiment, the SEI may be formed during the initial charging. The SEI may have a nanometer-order thickness.

The negative electrode 50 may have a thickness greater than or equal to 10 µm and less than or equal to 500 µm. When the negative electrode 50 has a thickness greater than or equal to 10 µm, the battery 100 has sufficient energy density. When the negative electrode 50 has a thickness less than or equal to 500 µm, the battery 100 can operate with high output power.

The area of the main surface of the battery 100 may be greater than or equal to 1 $cm^2$ and less than or equal to 100 $cm^2$, or greater than or equal to 100 $cm^2$ and less than or equal to 1000 $cm^2$. The "main surface" refers to a surface of the battery 100 that has the widest area. When the area of the main surface of the battery 100 is greater than or equal to 1 $cm^2$ and less than or equal to 100 $cm^2$, the battery 100 is suitable as a battery for portable electronic devices, such as smartphones and digital cameras. When the area of the main surface of the battery 100 is greater than or equal to 100 cm² and less than or equal to 1000 cm², the battery 100 is suitable as a battery for power supplies for large mobile devices, such as electric vehicles.

The battery 100 in the first embodiment may have various shapes, such as a coin shape, a cylindrical shape, a prismatic shape, a sheet shape, a button shape, a flat shape, and a stack shape. The battery 100 in the first embodiment is, for example, an all-solid state battery.

Next, a method for producing the battery 100 will be described.

First, the material of the first solid electrolyte layer 30, the material of the second solid electrolyte layer 40, the material of the positive electrode mixture layer, and the material of the negative electrode mixture layer are prepared. In this specification, the material of the positive electrode mixture layer may be referred to as a "positive electrode mixture". The material of the negative electrode mixture layer may be referred to as a "negative electrode mixture". The material of the first solid electrolyte layer 30 can be prepared by, for example, mixing a solid electrolyte and a metal powder made of the metal A at a certain mixing ratio in a mortar or the like. The material of the second solid electrolyte layer 40 is, for example, a solid electrolyte. The positive electrode mixture can be prepared by, for example, mixing a solid electrolyte and a positive electrode active material in a mortar or the like. The negative electrode mixture can be prepared by, for example, mixing a solid electrolyte and a negative electrode active material in a mortar or the like.

Next, an insulating casing is prepared. The material of the second solid electrolyte layer 40, the material of the first solid electrolyte layer 30, and the positive electrode mixture are packed in this order in the casing. Next, the negative electrode mixture is packed on the material of the second solid electrolyte layer 40. The negative electrode mixture is positioned opposite the material of the first solid electrolyte layer 30 across the material of the second solid electrolyte layer 40. Next, these materials are compacted into a multilayer body including a positive electrode mixture layer, the first solid electrolyte layer 30, the second solid electrolyte layer 40, and a negative electrode mixture layer. Next, a positive electrode current collector is disposed on the positive electrode mixture layer to produce the positive electrode 10. The negative electrode current collector is disposed on the negative electrode mixture layer to produce the negative electrode 50. A current collector lead is connected to each of the positive electrode current collector and the negative electrode current collector. The insulating casing is sealed with an insulating ferrule or the like so that the inside of the insulating casing is shut off from the outside atmosphere, whereby the battery 100 is produced.

During charging of the battery 100, lithium dendrite may grow from the negative electrode 50. Lithium dendrite significantly grows during quick charging of the battery 100. When lithium dendrite extends to the first solid electrolyte layer 30, lithium dendrite comes into contact with the metal A contained in the first solid electrolyte layer 30. The metal A in contact with lithium dendrite forms an alloy with lithium. This suppresses the growth of lithium dendrite to prevent lithium dendrite from reaching the positive electrode 10. Preventing lithium dendrite from reaching the positive electrode 10 can suppress occurrence of local short circuiting. The first solid electrolyte layer 30 can suppress occurrence of local short circuiting even when, for example, the battery 100 is charged at 0.7 C rate or higher. Since the first solid electrolyte layer 30 contains a solid electrolyte, the first solid electrolyte layer 30 has sufficient ionic conductivity. In the battery 100 including the first solid electrolyte layer 30, voltage abnormality is thus less likely to occur.

The potential at which lithium and aluminum form an alloy is 0.3 V vs. Li, which is close to the lithium redox potential. For this, when the metal A includes aluminum, the metal A in contact with lithium dendrite can easily form an alloy with lithium. In other words, the metal A can assuredly suppress the growth of lithium dendrite.

Since the battery 100 includes the second solid electrolyte layer 40, the first solid electrolyte layer 30 is not in direct contact with the negative electrode 50. In other words, the second solid electrolyte layer 40 blocks electron conduction between the first solid electrolyte layer 30 and the negative electrode 50. For this, even when the metal A contained in the first solid electrolyte layer 30 forms an alloy with lithium, the first solid electrolyte layer 30 has almost no effect on the negative electrode potential. In other words, the negative electrode potential is determined only by the material of the negative electrode 50. The second solid electrolyte layer 40 can further suppress occurrence of voltage abnormality in the battery 100.

In PTL 1, the alloy layer containing lithium is in direct contact with the negative electrode containing lithium as a main component. When the alloy layer has a higher electrode potential than lithium, the negative electrode potential of the battery of PTL 1 is affected not only by the negative electrode but also by the alloy layer. In the battery of PTL 1, the negative electrode potential is thus unstable, and voltage abnormality may occur.

Second Embodiment

Figure 2:
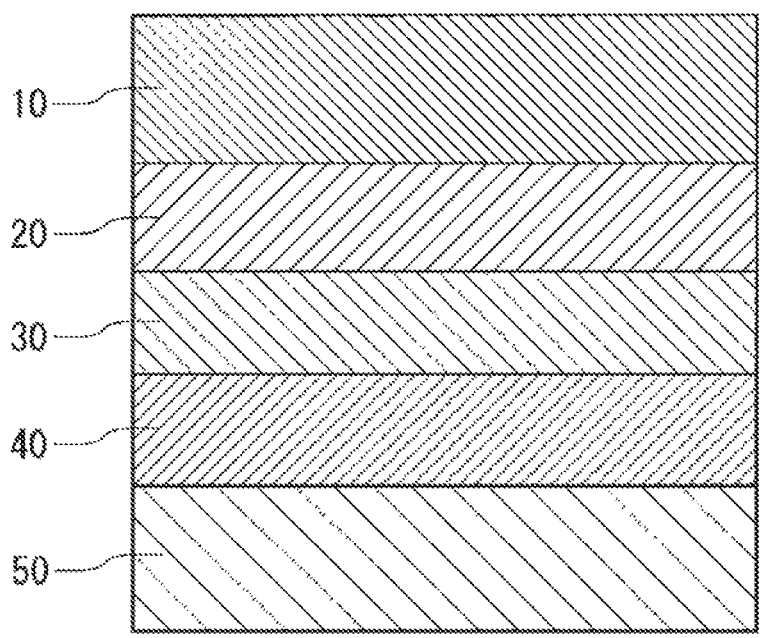
FIG. 2 is a schematic cross-sectional view of the structure of a battery according to a second embodiment.

FIG. 2 is a schematic cross-sectional view of the structure of a battery 110 according to a second embodiment. Referring to FIG. 2, the battery 110 includes a third solid electrolyte layer 20. Otherwise, the battery 110 has the same structure as the battery 100 of the first embodiment. The elements common to the battery 100 of the first embodiment and the battery 110 of this embodiment are assigned with the same reference numerals, and the description thereof may be omitted. In other words, the description of the second embodiment below may apply to the first embodiment as long as no technical inconsistency occurs. The embodiments may be combined with each other as long as no technical inconsistency occurs.

The third solid electrolyte layer 20 is positioned between the positive electrode 10 and the first solid electrolyte layer 30. The third solid electrolyte layer 20 is, for example, in direct contact with both the positive electrode 10 and the first solid electrolyte layer 30.

The third solid electrolyte layer 20 contains a solid electrolyte, but is free of the metal A alloyable with lithium. Examples of the solid electrolyte contained in the third solid electrolyte layer 20 include the solid electrolytes described above in the first solid electrolyte layer 30. The solid electrolyte contained in the third solid electrolyte layer 20 may be the same as or different from that contained in the first solid electrolyte layer 30 or the second solid electrolyte layer 40. The third solid electrolyte layer 20 contains, for example, the solid electrolyte as a main component. The third solid electrolyte layer 20 may consist essentially of the solid electrolyte. It is noted that the third solid electrolyte layer 20 may contain impurities in addition to the solid electrolyte. The third solid electrolyte layer 20 may further contain a binder in addition to the solid electrolyte layer.

Examples of the binder contained in the third solid electrolyte layer 20 include the binders described above in the first solid electrolyte layer 30.

The thickness of the third solid electrolyte layer 20 is not limited and is, for example, greater than or equal to 1 μm and less than or equal to 200 μm. When the third solid electrolyte layer 20 has a thickness greater than or equal to 1 μm, there is less possibility of short circuiting between the positive electrode 10 and the negative electrode 50. When the third solid electrolyte layer 20 has a thickness less than or equal to 200 μm, the battery 100 can operate with high input-output power. In this embodiment, a thickness of the first solid electrolyte layer 30 may be smaller than a thickness of the third solid electrolyte layer 20 in order to ensure sufficient ionic conductivity.

EXAMPLES

Embodiments of the present disclosure will be described below in more detail by way of Examples. It is noted that the present disclosure is not limited to the following Examples.

Example 1

Preparation of Sulfide Solid Electrolyte

First, $Li_2S$ and $P_2S_5$ were weighed in a glove box in an argon atmosphere at a dew point of −60° C. or lower. The molar ratio of $Li_2S$ and $P_2S_5$ weighed was $Li_2S:P_2S_5=75:25$. Next, $Li_2S$ and $P_2S_5$ were ground and mixed in a mortar. Next, the resulting mixture was milled in a planetary ball mill (Fritsch Japan Co., Ltd., P-7 model) at 510 rpm for 10 hours to provide a solid electrolyte in the form of glass. The solid electrolyte in the form of glass was heated in an inert atmosphere at 270 degrees for 2 hours. Accordingly, $Li_2S$—$P_2S_5$, a solid electrolyte in the form of glass ceramics, was produced.

Preparation of Material of First Solid Electrolyte Layer

The sulfide solid electrolyte and a metal powder made of aluminum were weighed in a globe box in an argon atmosphere. The average particle size of the metal powder was 3 μm. The volume ratio of the weighed sulfide solid electrolyte and the weighed metal powder was 50:50. The sulfide solid electrolyte and the metal powder were mixed in an agate mortar to prepare the material of the first solid electrolyte layer.

Preparation of Positive Electrode Mixture

The sulfide solid electrolyte and the positive electrode active material were weighed in a globe box in an argon atmosphere. As the positive electrode active material, $Li(NiCoMn)O_2$ (hereinafter referred to as NCM) was used. The volume ratio of the weighed sulfide solid electrolyte and the weighed positive electrode active material was 30:70. The sulfide solid electrolyte and the positive electrode active material were mixed in an agate mortar to prepare a positive electrode mixture.

Preparation of Negative Electrode Mixture

The sulfide solid electrolyte material and a negative electrode active material were weighed in a globe box in an argon atmosphere. Graphite was used as the negative electrode active material. The volume ratio of the weighed sulfide solid electrolyte and the weighed negative electrode active material was 40:60. The sulfide solid electrolyte and the negative electrode active material were mixed in an agate mortar to prepare a negative electrode mixture.

Production of Secondary Battery

The following process was carried out by using the material of the first solid electrolyte layer, the positive electrode mixture, the negative electrode mixture, and $Li_2S$—$P_2S_5$, a sulfide solid electrolyte in the form of glass ceramics.

First, the sulfide solid electrolyte, the material of the first solid electrolyte layer, the sulfide solid electrolyte, and the positive electrode mixture were packed in an insulating casing in this order. Next, the negative electrode mixture was packed on the outermost sulfide solid electrolyte. Next, these materials were compacted at a pressure of 360 MPa to form a multilayer body including the positive electrode mixture layer, the third solid electrolyte layer, the first solid electrolyte layer, the second solid electrolyte layer, and the negative electrode mixture layer. Next, a current collector made of stainless steel was disposed on each end of the obtained multilayer body. Each current collector was provided with a current collector lead. The insulating casing was sealed with an insulating ferrule so that the inside of the insulating casing was shut off from the outside atmosphere, whereby a battery of Example 1 was produced.

Comparative Example 1

The material of the first solid electrolyte layer, the sulfide solid electrolyte, and the positive electrode mixture were packed in an insulating casing in this order. Next, the negative electrode mixture was packed on the outermost material of the first solid electrolyte layer to produce a battery having a structure in which the first solid electrolyte layer was in direct contact with the negative electrode.

Comparative Example 2

A battery of Comparative Example 2 was produced by the same method as in Example 1 except that the material of the first solid electrolyte layer was not packed in an insulating casing.

Charging Test

Figure 3:
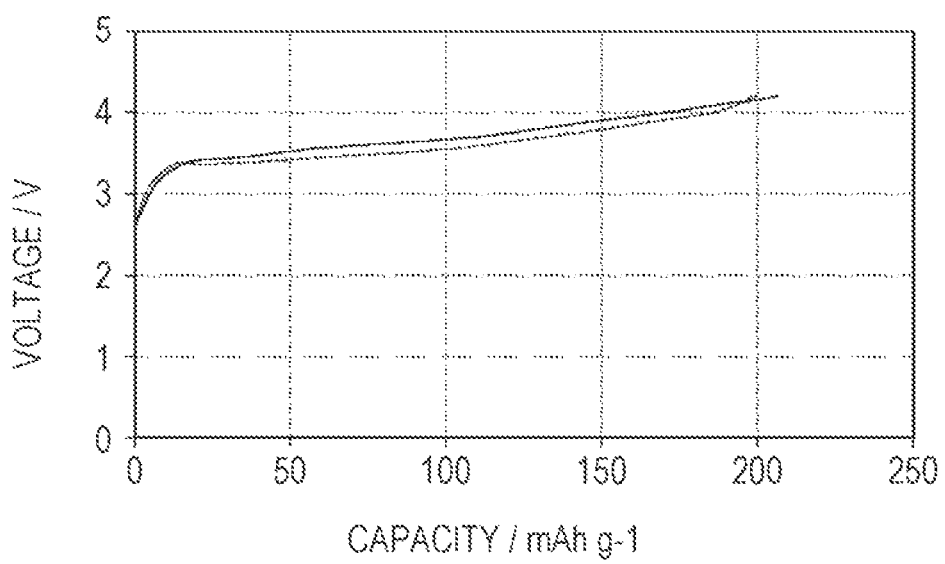
FIG. 3 is a graph showing the charging curves of batteries of Example 1 and Comparative Example 1.

A charging test was carried out under the following conditions using the batteries of Example 1 and Comparative Example 1. First, the batteries were placed in a thermostatic oven at 25° C. Each battery was charged at a constant current of 0.17 mA corresponding to 0.05 C rate based on the theoretical capacity of the battery until the voltage reached 4.2 V. The charging curves during 0.05 C charging of the batteries of Example 1 and Comparative Example 1 were obtained accordingly. FIG. 3 is a graph showing the charging curves of the batteries of Example 1 and Comparative Example 1.

Figure 4:
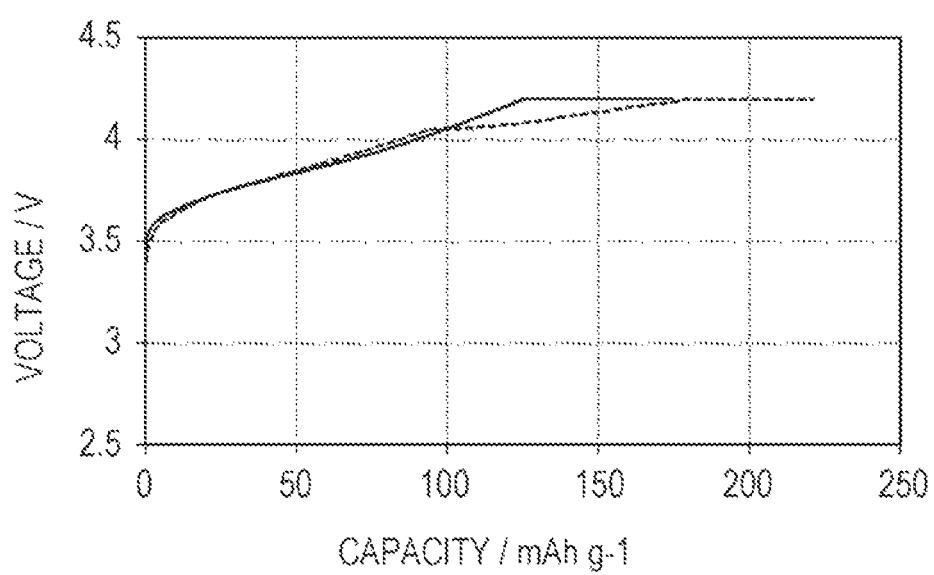
FIG. 4 is a graph showing the charging curves of batteries of Example 1 and Comparative Example 2.

A charging test was carried out under the following conditions using the batteries of Example 1 and Comparative Example 2. First, the batteries were placed in a thermostatic oven at 25° C. Each battery was charged at a constant current of 3.4 mA corresponding to 1 C rate (1 hour rate) based on the theoretical capacity of the battery until the voltage reached 4.2 V. The charging curves during 1 C charging of the batteries of Example 1 and Comparative Example 2 were obtained accordingly. FIG. 4 is a graph showing the charging curves of the batteries of Example 1 and Comparative Example 2.

As described above, the battery of Example 1 included a first solid electrolyte layer formed from a metal powder made of aluminum and a sulfide solid electrolyte, a second solid electrolyte layer formed from a sulfide solid electrolyte, and a third solid electrolyte layer. In the battery of Example 1, the first solid electrolyte layer was disposed between the second solid electrolyte layer and the third solid electrolyte layer. As shown in FIG. 3, no voltage abnormality was observed during 0.05 C and 1 C charging in the battery of Example 1 having a three-layer structure including the first solid electrolyte layer, the second solid electrolyte layer, and the third solid electrolyte layer.

On the other hand, voltage abnormality was observed at the initial stage of 0.05 C charging in Comparative Example 1 in which the first solid electrolyte layer was in direct contact with the negative electrode mixture. This may be because the electron conduction between the first solid electrolyte layer and the negative electrode was not blocked because of the absence of the second solid electrolyte, and the metal contained in the first solid electrolyte layer formed an alloy with lithium, which affected the negative electrode potential.

In Comparative Example 2 without the first solid electrolyte layer, voltage abnormality was observed in the final stage of 1 C charging. Voltage abnormality may have occurred in the following manner. First, the negative electrode potential reaches the lithium redox potential. Lithium is thus deposited on the negative electrode. Deposited lithium grows as a dendrite in the solid electrolyte. Upon some of deposited lithium reaching the positive electrode, short circuiting locally occurs. This may have caused voltage abnormality.

As described above, it is found that a battery that includes a first solid electrolyte layer containing the metal A alloyable with lithium and in which the first solid electrolyte layer is not in direct contact with the negative electrode causes less voltage abnormality. This indicates that the first solid electrolyte layer can improve the charging/discharging characteristics of the battery.

The battery according to the present disclosure may be used as, for example, an all-solid state battery.

What is claimed is:

1. A battery comprising:
   a positive electrode; a negative electrode;
   a first solid electrolyte layer that is positioned between the positive electrode and the negative electrode and that contains particles of a metal alloyable with lithium; and
   a second solid electrolyte layer that is positioned between the negative electrode and the first solid electrolyte layer and that is free of the metal.

2. The battery according to claim 1, wherein a thickness of the first solid electrolyte layer is smaller than a thickness of the second solid electrolyte layer.

3. A battery comprising:
   a positive electrode; a negative electrode;
   a first solid electrolyte layer that is positioned between the positive electrode and the negative electrode and that contains a metal alloyable with lithium;
   a second solid electrolyte layer that is positioned between the negative electrode and the first solid electrolyte layer and that is free of the metal; and
   a third solid electrolyte layer that is positioned between the positive electrode and the first solid electrolyte layer and that is free of the metal.

4. The battery according to claim 1, wherein the metal includes at least one selected from the group consisting of gold, silicon, aluminum, zinc, cadmium, indium, lead, gallium, bismuth, antimony, tin, silver, and magnesium.

5. The battery according to claim 4, wherein the metal includes aluminum.

6. The battery according to claim 1, wherein a content of the metal in the first solid electrolyte layer is greater than or equal to 20 vol % and less than or equal to 80 vol %.

7. The battery according to claim 3, wherein a thickness of the first solid electrolyte layer is smaller than a thickness of the second solid electrolyte layer.

8. The battery according to claim 3, wherein the metal includes at least one selected from the group consisting of gold, silicon, aluminum, zinc, cadmium, indium, lead, gallium, bismuth, antimony, tin, silver, and magnesium.

9. The battery according to claim 3, wherein the metal includes aluminum.

10. The battery according to claim 3, wherein a content of the metal in the first solid electrolyte layer is greater than or equal to 20 vol % and less than or equal to 80 vol %.

* * * * *